(12) United States Patent
Aibazov et al.

(10) Patent No.: US 7,398,917 B2
(45) Date of Patent: Jul. 15, 2008

(54) PAYMENT V.I.P. CARD

(75) Inventors: Oleg Umarovich Aibazov, Moscow (RU); Sergei Konstantinovich Belov, Moscow (RU); Vyacheslav Olegovich Dolgikh, Moscow (RU)

(73) Assignee: Oleg Umarovich AIBAZOV, Moscow (RU)

( * ) Notice: Subject to any disclaimer, the term of this patent is extended or adjusted under 35 U.S.C. 154(b) by 413 days.

(21) Appl. No.: 11/058,438

(22) Filed: Feb. 14, 2005

(65) Prior Publication Data

US 2005/0216350 A1 Sep. 29, 2005

(51) Int. Cl.
*G07F 19/00* (2006.01)
(52) U.S. Cl. .................. 235/379; 235/380; 235/488; 705/19; 283/92; 441/7; 441/15
(58) Field of Classification Search .............. 235/379, 235/380, 488; 705/19; 283/92; 442/7, 15
See application file for complete search history.

(56) References Cited

U.S. PATENT DOCUMENTS

| 3,793,600 | A | * | 2/1974 | Grosbard | 235/491 |
| 4,931,629 | A | * | 6/1990 | Frankfurt | 235/488 |
| 6,025,283 | A | * | 2/2000 | Roberts | 442/15 |
| 6,813,011 | B2 | * | 11/2004 | Gardner et al. | 356/71 |
| 2003/0019925 | A1 | * | 1/2003 | Cannon et al. | 235/380 |
| 2003/0116633 | A1 | * | 6/2003 | Clayman et al. | 235/488 |

* cited by examiner

*Primary Examiner*—Michael G. Lee
*Assistant Examiner*—Allyson N Trail
(74) *Attorney, Agent, or Firm*—patenttm.us

(57) ABSTRACT

This invention relates to a universal financial product and enables to use it for managing money resources, e.g., sums being on a personal account. The housing of the pay card may be made of a precious or rare metal, bone, finewood; the elements of the features of a pay system and an issuing bank as well as those of protection and personalization are also made of the said materials, including precious stones, by engraving and inlaying. A place is provided for a standard electronic chip, which may be replaced. Periods of use of the pay card and the reliability of its level of protection against imitating and counterfeiting are increased.

36 Claims, 1 Drawing Sheet

PAYMENT V.I.P. CARD

BACKGROUND OF THE INVENTION

This invention relates to a card that is an integrated financial product enabling to use it for making a variety of payments, in particular for managing money resources for the purposes of guaranteed payments to the organization, which has issued the card, e.g., for managing money at a personal account.

It is known that at present a wealthy and privileged part of clients provides a major part of bank income derived from issuing plastic cards; on an average, 10 percent of such clients effect a half of the total number of transactions.

It is necessary to note that strategies of many companies is aimed at providing banks with financial products capable of satisfying needs of privileged clients in full. For example, cards of the Premium category enable the cooperating banks to:

increase the loyalty of their existing clients;
increase the volume of their cashless expenditures;
attract new clients.

As an example, Europay International Company, being the biggest international pay system with the strategic goal to become the most preferable international pay system in Europe, offers to banks three types of cards included into the Premium category; each of them being intended for a definite category of privileged clients and is clearly positioned in the respective market segment.

The segmentation of the Premium products is supported by the establishment of the minimum servicing standards for each type of cards and forms the basis for strengthening relations between banks and clients.

Eurocard/MasterCard Platinum card is a card for the "upper level" in the segment of privileged clients. It is intended for businessmen making frequent business trips and interested in various bonus programs. Such clients account for 15-20 percent of the total client base of a bank. The minimum company's standards for a Platinum card guarantee that their holders will enjoy a higher level of servicing than holders of the Gold cards.

Eurocard/MasterCard Gold card is a card for clients, who need higher, as compared to standard, limits of expenditure and a higher level of servicing; such clients account for about 25 percent of the total client base of a bank. The minimum range of services, as offered to holders of such cards, is inevitably higher that the offering level for the Eurocard/MasterCard Standard cards.

Word Signia is a card for clients enjoying the right to individual banking servicing, whose income is at least US $160,000.-per year. The number of such clients does not exceed 5 percent of the total client base.

The minimum servicing standards of the Word Signia card holders guarantee that the client enjoys a higher level of servicing, as compared to that of other card holders.

(*New Payment Technologies*. Ed. by A. I. Grizov, M. AOZT "Recon", 2001, p. 35.)

However, all the products known in this field (pay cards of carious pay systems) have, due to their mass production, an insufficient set of features providing for individual preferences of their holders, including the requirements of uniqueness, protection, art design, etc.

However, there has always existed and will continue to exist a category of clients, where each client would like to get even more attention from banks, originality, good showing and attention to his/her person, as well as the uniqueness of a pay instrument evidencing a definite social status.

The technical task to be solved is to expand the range of technical means and create a pay instrument complying with wishes of privileged clients in banks.

The technical result to be achieved is to increase periods of use of a pay card and the reliability of its level of protection against imitating and counterfeiting.

SUMMARY OF THE INVENTION

The said technical result is achieved due to the fact that a pay card comprises a housing, a microprocessor device, elements of the features relating to a pay system and an issuing bank, those of protection and personalization, wherein the pay card housing being made of a precious or rare metal, the elements of the features relating to a pay system and an issuing bank, protection and personalization being made of precious and/or semi-precious stones in combination, or without it, with finewood and/or bone; or the pay card housing being made of finewood and the elements of the features relating to a pay system and an issuing bank, protection and personalization being made of a precious and/or rare metal in combination, or without it, with precious and or semi-precious stones and/or bone; or the pay card housing being made of bone, and the elements of the features relating to a pay system and an issuing bank, protection and personalization being made of a precious or semi-precious metal in combination, or without it, with precious or semi-precious stones, finewood; and due to the fact that gold and/or platinum and/or silver are used as precious metals; and due to the fact that brilliants and/or sapphires and/or rubies and/or emeralds and/or similar stones are used as precious stones; and due to the fact that nephrite and/or lazurite and/or malachite and/or chalcedony and/or similar to them are used as semi-precious stones; and due to the fact that redwood and/or box-tree and/or sandal wood and/or black wood and/or similar to them are used as finewood; and due to the fact that horns and/or tusks are used as bone; as well as due to the fact that the microprocessor device is fixed in the housing with the possibility of being replaced, as well as that the elements of the features relating to a pay system and an issuing bank, protection and personalization are made engraved and/or inlaid and/or threaded and/or electroformed, as well as the elements of protection and personalization are made as fragments of heraldry, family coat of arms, other attributes, and are arranged on the face side and/or on the reverse side of the housing; as well as that on the pay card housing, on its reverse side, a place is provided for s signature; as well as that titanium, lithium, molybdenum and/or metals similar to them are used as rare metals; as well as that the housing is made in the form of a monolithic plate or a piece having the geometrical form of a plate made as an open work piece and/or an engraved piece and/or a cast piece and/or a forged piece, or in another similar form.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE PREFERRED EMBODIMENTS

Figure 1:
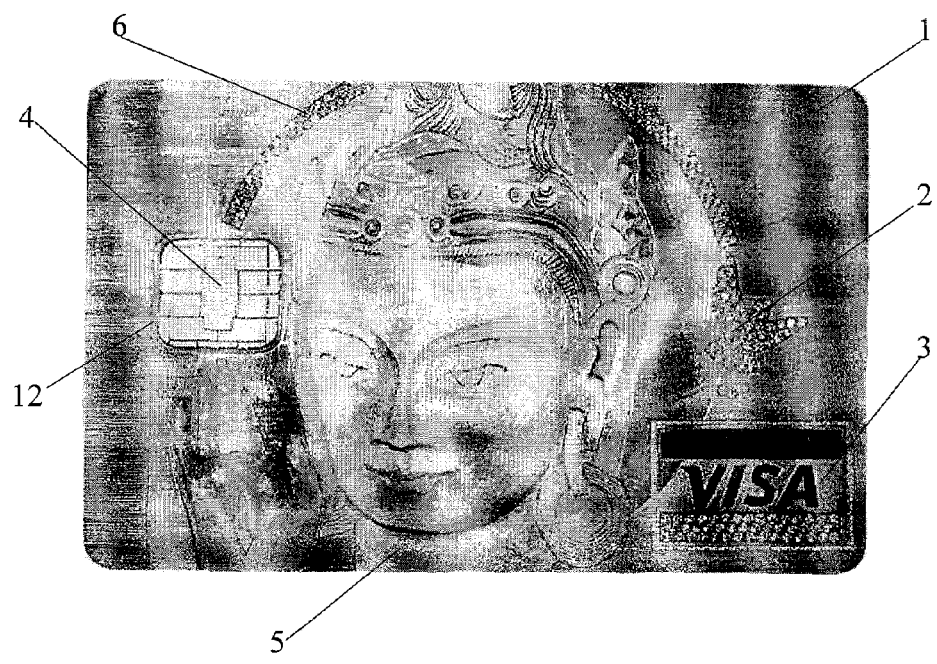
FIG. 1 is an example of first face of a pay card according to an embodiment of the invention.
Figure 2:
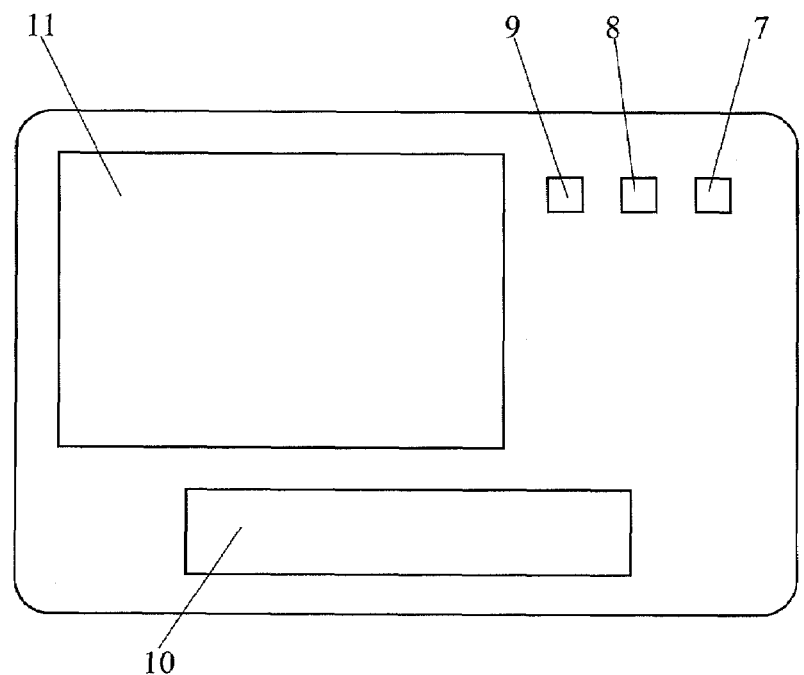
FIG. 2 is a view of a reverse face of the pay card.

An example of a pay card according to the first embodiment (claim 1) is shown in a photo of a mock-up, where on the face side and the reverse side shown are: the housing 1, the elements 2, 3 of the features relating to a pay system and an issuing bank, the microprocessor device 4, the elements 5, 6, 7, 8, 9, 10, 11 of protection and personalization, the dielectric element 12 made as a frame.

In the shown example the housing 1 of the pay card is made of a precious metal; the elements 2, 3 are made of precious stones; the microprocessor device 4 is a standard electronic chip and is arranged in a definite place; the elements 5, 6 are author's art elements of protection and are made of a precious metal and precious stones, elements of protection also being made on the reverse side by engraving and inlaying; 7—a hallmark, if it is required by law, 8—author's stamp, 9—manufacturer's trademark; 10—the place for the signature of the pay card holder; 11—a place for individual attributes; the element 12 is made of bone or finewood.

According to the second embodiment (claim 2, no photo) the housing I of the pay card is made of finewood; the elements 2, 3 are made of precious or semi-precious stones; the microprocessor device 4 is a standard state-of-the-art electronic chip at the time of making a pay card under this invention; the elements 5, 6 are inlaid works made of a precious metal and/or precious stones; 7, 8, 9 are places for a hallmark, if it is required by law, the author's stamp, a manufacturer's trademark, these may be made as inserts made of a precious metal; 10—the place for the signature of the pay card holder, it may also be made as a precious metal insert; 11—a place for individual attributes; the element 12 is made of bone or a precious metal.

According to the third embodiment (claim 3, no photo) the housing 1 of the pay card is made of bone; the elements 2, 3 are made of precious stones; the microprocessor device is a standard unit; the elements 5, 6 are made of a precious metal and/or precious stones; 7, 8, 9 are places for a hallmark, if it is required by law, the author's stamp, a manufacturer's trademark; 10—the place for the signature; 11—a place for individual attributes; 12 is a deepened spot in the housing, which is inlaid with finewood and a precious metal.

As far as the working of the invention is concerned, according to the first embodiment the housing 1 is made of gold, silver, platinum, rare metals, such as titanium, lithium, molybdenum or similar metals. Soft metals are melted, poured into a form, rolled to the required thickness; hard metals are cut and machined; precious stones are fixed with the use of corners, which are cut in advance in the housing by special burins. Recesses or holes are made along the contour of a stone for semi-precious stones, which then are fixed according to a known technology (a glue, a case, etc.).

Then everything is turned, grounded and polished to the thickness of the housing 1; the element 12, which is inlaid with bone or finewood, apart from ensuring art perception, performs the function of a dielectric material for the microprocessor 4, bone and finewood are glued into elements of deep engraving and curled for ensuring reliable fixation.

According to the second embodiment the housing 1 is made of finewood by sawing and treating raw finewood to required dimensions; the other materials (a precious metal, precious stones, etc.) are glued into the places prepared in advance or put into cuts and fixed on the housing 1, then they are grounded and polished. The microprocessor device 4, as in the first embodiment, is installed into the place intended for it. The element 12 (a deepened spot with a frame) is inlaid with bone and a precious metal.

According to the third embodiment the housing 1 is made of bone also by sawing and treating to required dimensions; then it is manufactured in accordance with the previous embodiments for the purpose of fixing precious stones, a precious metal or finewood on it; the microprocessor device 4 is installed into the recess 12, the said element 12 being inlaid with finewood and a precious metal.

Gold, silver, platinum of standard fineness (so-called jewelry alloys) are used, which contain additives of copper, brass, bronze, lithium.

Cut diamonds, sapphires, rubies, emeralds etc. are used as precious stones; and nephrite, lazurite, malachite, chalcedony, etc. are used as semi-precious stones; thus, for example, on the mock-up photo the element 5 and the housing 1 are made of gold of 583 standard fineness; the element 2, a pigeon, which is shown in the hologram of the known pay system, is made of brilliants; the element 3, the logotype of the pay system, is made of sapphires and brilliants.

Red wood, box-tree wood, sandal wood, black wood and similar kinds of wood are used as finewood in all the three embodiments. They may be used, for example, for making the dielectric frame 12 for the microprocessor device 4 according to the first embodiment of a pay card under this invention, wherein the frame 12 is both a decorative element and the dielectric substrate.

Horns of an argali, a rhinoceros, tusks of a walrus, a mammoth or similar animals may be used as jobbing bone.

For the microprocessor device 4 a container or guides may be made; in such a case it may be made replaceable.

Certain elements on the pay card housing 1, as, e.g., the elements 5, 10, 11, may be made by embossing, engraving, electrotyping.

If a pay card holder wishes so, family coats of arms, heraldry elements, other attributes may be used as personalization elements; moreover, they may be made of the above materials and by different technical methods.

A place for signature is provided for on the reverse side of the housing 1; according to the first embodiment the signature is engraved with a special tool directly on the housing 1, in a case where the housing 1 is made of bone or finewood, a precious metal insert may be made, e.g., of gold, and fixed in the place intended for signature.

Lithium, molybdenum, titanium or similar metals may be used as rare metals.

Stones of Groups I, II or III, which are suitable for proper cutting, may be used as precious or semi-precious stones, depending on the social status of a pay card holder.

The cited embodiments of this invention are not intended to limit the scope of claims of the applicant, but serve only as illustrations to the preferred embodiment of the technical solution.

It is necessary to note that as protection and personalization for the purposes of this invention the creation of a set of identifying features on the housing 1 is understood, including the features established by the respective pay system and the issuing bank.

It is also necessary to state that the proposed pay card fully conforms to the international standards ISO 7810, ISO 7813, ISO 7816 as well as to the Russian standard GOST R 50809.

What is claimed is:

1. A pay card comprising a housing, a microprocessor device, elements of features of a pay system and an issuing bank, protection and personalization, characterized in that the housing of the pay card is made of a precious or rare metal, the elements of the features of a pay system and an issuing bank, protection and personalization being made of precious and/or semi-precious stones in combination with finewood and bone.

2. A pay card according to claim 1, characterized in that gold and/or platinum and/or silver are used as a precious metal.

3. A pay card according to claim 1, characterized in that brilliants and/or sapphires and/or rubies and/or emeralds are used as precious stones.

4. A pay card according to claim 1, characterized in that nephrite and/or lazurite and/or chalcedony are used as semi-precious stones.

5. A pay card according to claim 1, characterized in that red wood and/or box-tree wood and/or sandal wood and/or black wood are used as finewood.

6. A pay card according to claim 1, characterized in that the microprocessor device is fixed in the housing with the possibility of being replaced.

7. A pay card according to claim 1, characterized in that the elements of the features of a pay system and an issuing bank, protection and personalization are made by engraving and/or inlaying and/or threading and/or electrotyping.

8. A pay card according to claim 1, characterized in that titanium, and/or lithium, and/or molybdenum are used as a rare metal.

9. A pay card according to claim 1, characterized in that the housing is made in the form of a monolithic plate or a piece having a geometrical form of a plate made as an open work piece and/or an engraved piece and/or a cast piece and/or a forged piece.

10. A pay card comprising a housing, a microprocessor device, elements of features of a pay system and an issuing bank, protection and personalization, characterized in that the housing of the pay card is made of finewood, the elements of the features of a pay system and an issuing bank, protection and personalization being made of a precious and/or semi-precious metal in combination with precious or semi-precious stones and bone.

11. A pay card according to claim 10, characterized in that gold and/or platinum and/or silver are used as a precious metal.

12. A pay card according to claim 10, characterized in that brilliants and/or sapphires and/or rubies and/or emeralds are used as precious stones.

13. A pay card according to claim 10, characterized in that nephrite and/or lazurite and/or chalcedony are used as semi-precious stones.

14. A pay card according to claim 10, characterized in that red wood and/or box-tree wood and/or sandal wood and/or black wood are used as finewood.

15. A pay card according to claim 10, characterized in that the microprocessor device is fixed in the housing with the possibility of being replaced.

16. A pay card according to claim 10, characterized in that the elements of the features of a pay system and an issuing bank, protection and personalization are made by engraving and/or inlaying and/or threading and/or electrotyping.

17. A pay card according to claim 10, characterized in that titanium, and/or lithium, and/or molybdenum are used as a rare metal.

18. A pay card according to claim 10, characterized in that the housing is made in the form of a monolithic plate or a piece having a geometrical form of a plate made as an open work piece and/or an engraved piece and/or a cast piece and/or a forged piece.

19. A pay card comprising a housing, a microprocessor device, elements of features of a pay system and an issuing bank, protection and personalization, characterized in that the housing of the pay card is made of bone, the elements of the features of a pay system and an issuing bank, protection and personalization being made of a precious and/or semi-precious metal in combination, or without combination, with precious or semi-precious stones and/or finewood.

20. A pay card according to claim 19, characterized in that gold and/or platinum and/or silver are used as a precious metal.

21. A pay card according to claim 19, characterized in that brilliants and/or sapphires and/or rubies and/or emeralds are used as precious stones.

22. A pay card according to claim 19, characterized in that nephrite and/or lazurite and/or chalcedony are used as semi-precious stones.

23. A pay card according to claim 19, characterized in that red wood and/or box-tree wood and/or sandal wood and/or black wood are used as finewood.

24. A pay card according to claim 19, characterized in that horns and/or tusks are used as bone.

25. A pay card according to claim 19, characterized in that the microprocessor device is fixed in the housing with the possibility of being replaced.

26. A pay card according to claim 19, characterized in that the elements of the features of a pay system and an issuing bank, protection and personalization are made by engraving and/or inlaying and/or threading and/or electrotyping.

27. A pay card according to claim 26, characterized in that the elements of protection and personalization are made as fragments of heraldry, and/or family coats of arms, and are arranged on a front side and/or on a back side of the housing.

28. A pay card according to claim 27, characterized in that a place for making a signature is provided for on the pay card housing, on the back side.

29. A pay card according to claim 19, characterized in that titanium, lithium, molybdenum are used as a rare metal.

30. A pay card according to claim 19, characterized in that the housing is made in the form of a monolithic plate or a piece having a geometrical form of a plate made as an open work piece and/or an engraved piece and/or a cast piece and/or a forged piece.

31. A pay card comprising a housing, a microprocessor device, elements of features of a pay system and an issuing bank, protection and personalization, characterized in that the housing of the pay card is made of a precious or rare metal, the elements of the features of a pay system and an issuing bank, protection and personalization being made of precious and/or semi-precious stones in combination, or without combination, with finewood and/or bone, characterized in that horns and/or tusks are used as bone.

32. A pay card comprising a housing, a microprocessor device, elements of features of a pay system and an issuing bank, protection and personalization, characterized in that the housing of the pay card is made of a precious or rare metal, the elements of the features of a pay system and an issuing bank, protection and personalization being made of precious and/or semi-precious stones in combination, or without combination, with finewood and/or bone, characterized in that the elements of the features of a pay system and an issuing bank, protection and personalization are made by engraving and/or inlaying and/or threading and/or electrotyping; and characterized in that the elements of protection and personalization are made as fragments of heraldry, and/or family coats of arms, and are arranged on the face side and/or on the reverse side of the housing.

33. A pay card according to claim 32, characterized in that a place for making a signature is provided for on the pay card housing, on the reverse side.

34. A pay card comprising a housing, a microprocessor device, elements of features of a pay system and an issuing bank, protection and personalization, characterized in that the housing of the pay card is made of finewood, the elements of the features of a pay system and an issuing bank, protection and personalization being made of a precious and/or semi-precious metal in combination, or without combination, with precious or semi-precious stones and/or bone, characterized in that horns and/or tusks are used as bone.

35. A pay card comprising a housing, a microprocessor device, elements of features of a pay system and an issuing bank, protection and personalization, characterized in that the housing of the pay card is made of finewood, the elements of the features of a pay system and an issuing bank, protection and personalization being made of a precious and/or semi-precious metal in combination, or without combination, with precious or semi-precious stones and/or bone, characterized in that the elements of the features of a pay system and an issuing bank, protection and personalization are made by engraving and/or inlaying and/or threading and/or electrotyping, and characterized in that the elements of protection and personalization are made as fragments of heraldry, and/or family coats of arms, and are arranged on a front side and/or on a back side of the housing.

36. A pay card according to claim 35, characterized in that a place for making a signature is provided for on the pay card housing, on the reverse side.

* * * * *